(12) United States Patent
Shin et al.

(10) Patent No.: US 8,880,701 B2
(45) Date of Patent: Nov. 4, 2014

(54) SYSTEM AND METHOD FOR SUPPORTING OF NETWORK SERVICE

(75) Inventors: Myung Ki Shin, Deajeon (KR); Sang Jin Jeong, Daejeon (KR); Ki Hyuk Nam, Daejeon (KR); Hyoung Jun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 420 days.

(21) Appl. No.: 13/308,713

(22) Filed: Dec. 1, 2011

(65) Prior Publication Data

US 2012/0151064 A1 Jun. 14, 2012

(30) Foreign Application Priority Data

Dec. 14, 2010 (KR) .......... 10-2010-0127719

(51) Int. Cl.
*G06F 15/173* (2006.01)
*H04L 29/08* (2006.01)
*H04L 12/24* (2006.01)
*G06F 9/445* (2006.01)
*G06F 9/44* (2006.01)

(52) U.S. Cl.
CPC .............. *G06F 15/173* (2013.01); *H04L 67/34* (2013.01); *H04L 41/00* (2013.01); *G06F 8/36* (2013.01); *G06F 8/61* (2013.01)
USPC ....................................................... 709/226

(58) Field of Classification Search
CPC ....... H04L 67/34; H04L 41/00; G06F 15/173; G06F 8/61

USPC .......................................................... 709/226
See application file for complete search history.

(56) References Cited

U.S. PATENT DOCUMENTS

| 2007/0165615 | A1* | 7/2007 | Shin et al. ..................... 370/356 |
| 2007/0255798 | A1* | 11/2007 | Schneider ..................... 709/217 |
| 2008/0288940 | A1* | 11/2008 | Adams et al. .................... 718/1 |
| 2008/0288941 | A1* | 11/2008 | Adams et al. .................... 718/1 |
| 2009/0132840 | A1* | 5/2009 | Talwar et al. ................. 713/320 |
| 2009/0249335 | A1* | 10/2009 | Vasilevsky et al. .............. 718/1 |
| 2012/0304285 | A1* | 11/2012 | Simeral et al. ................. 726/21 |

OTHER PUBLICATIONS

The GENI Project Office; "GENI Global Environment for Network Innovations, GENI Control Framwork Requirements", Document ID: GENI-SE-CF-RQ-01.3, Jan. 9, 2009; 29 pages.

* cited by examiner

*Primary Examiner* — David X Yi
(74) *Attorney, Agent, or Firm* — Ladas & Parry LLP

(57) ABSTRACT

Disclosed are a network service architecture and a service supporting method to embody a dynamic program that allows a service provider to provide various services. The present invention suggests a network service architecture that is configured by a service producer, a service provider, a network device, and a network service store and provides a processes of making a program required for the service using an open API and an interface, notifying the service to the network service store, and dynamically installing the program in the network device based on the network service architecture. According to exemplary embodiments of the present invention, it is possible to diversely make and install a dynamic program, which are demanded by the service provider, in the network devices.

11 Claims, 9 Drawing Sheets

NETWORK DEVICE ARCHITECTURE
(ROUTER, PC, WIRELESS DEVICE, ETC.)

SYSTEM AND METHOD FOR SUPPORTING OF NETWORK SERVICE

CROSS-REFERENCE TO RELATED APPLICATIONS

This application claims priority to and the benefit of Korean Patent Application No. 10-2010-0127719 filed in the Korean Intellectual Property Office on Dec. 14, 2010, the entire contents of which are incorporated herein by reference.

TECHNICAL FIELD

The present invention relates to a system and a method for supporting a network service, and more specifically, to a system and a method for supporting a network service by dynamically providing a program for processing a network service.

BACKGROUND

Since conventional network equipment such as a router, a switch, a PC, or a wireless router is provided with a service program fixed by device vendors, it is difficult to install or use a dynamic program or a service that meets various demands of future service providers. For example, if a service provider develops a new service such as a video multicast to additionally install the service into network equipment such as a router, the service provider needs to consult with the network vendors to select a supportive method that the vendor develops a program fitted to the equipment and installs the program thereto. In this case, whenever the service provider provides a new service, the service provider needs to wait until the vender develops and supports the function upon the specific request from the service provider. Further, if various network devices such as a router, a switch, a PC, or wireless router are required, the service provider should request the corresponding vendors to develop multi service programs. Further, it is difficult to dynamically install the network service.

SUMMARY

The present invention has been made in an effort to provide a system and a method for supporting a network service that supports a network service by dynamically providing a program for processing a network service through a network service store.

An exemplary embodiment of the present invention suggests a method of dynamically download a network service program in a network device that would be used in a future Internet such as a router, a switch, a PC or a wireless router using a network service store.

It is suggested that the network service store is configured by an open API and programmer interface function, a network resource management agent function, and a program/service list management and upload agent function.

It is suggested that a future Internet service producer develops a network program required for a service using a network device open API and interface and then upload and notify the service to the network service store.

It is suggested that the future Internet service provider selects a network device or a necessary resource (CPU, storage, a memory, a bandwidth, etc.) required for the service from the network service store, and then selects the network program module required for the network device from the network service store to dynamically install the program module into the network device.

It is suggested that in the network device which will be used in the future Internet, an adapter modifies the open API to be fitted to the hardware of the corresponding device in order to install an open service program programmed by a service producer.

According to exemplary embodiments of the present invention, the following advantages can be obtained by dynamically providing a program for processing a network service through a network service store to support the network service: it is possible to develop various dynamic programs required by a service provider to provide the programs to the conventional network equipment in which only static programs are installed. Further, it is possible to develop and provide various services that are demanded by the service provider by differentiating the grade of service and rate system as compared to the conventional service that could provide only IP based Internet service.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
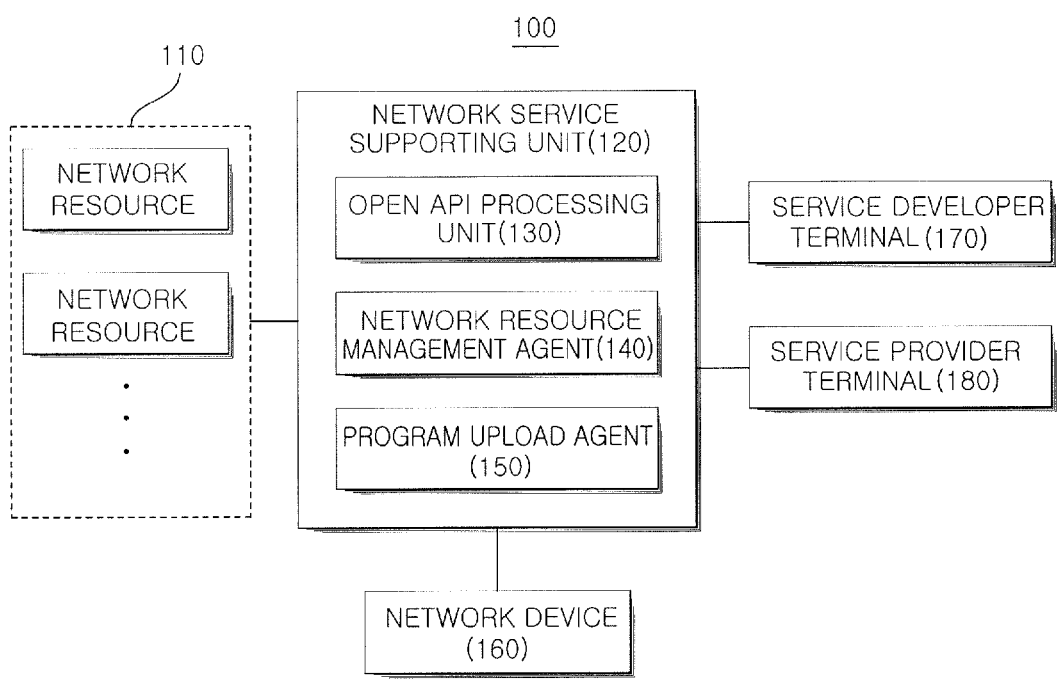
FIG. 1 is a block diagram schematically showing a network service supporting system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 2:
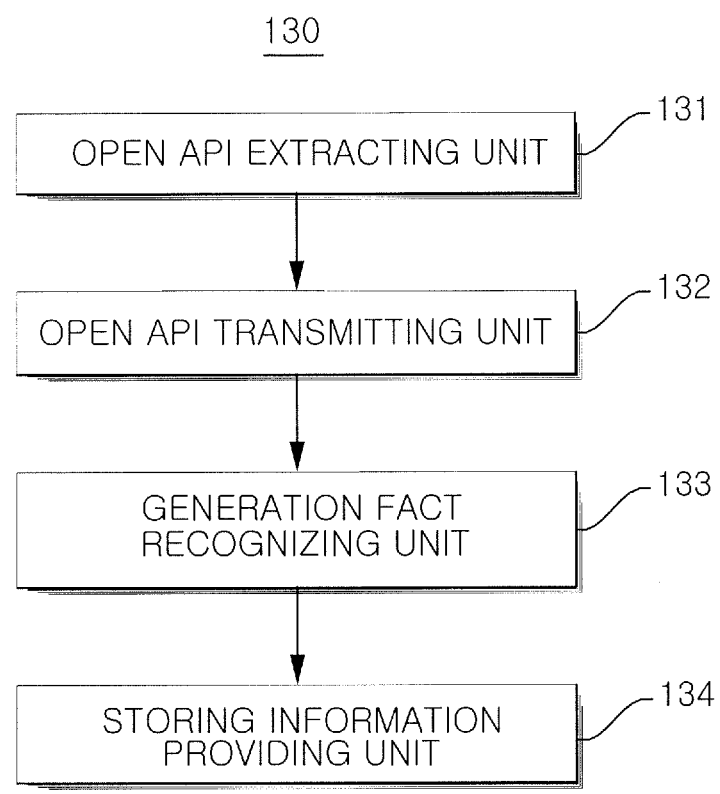
FIGS. 2 to 4 are block diagrams showing an internal configuration of the network service supporting system in detail.
Figure 3:
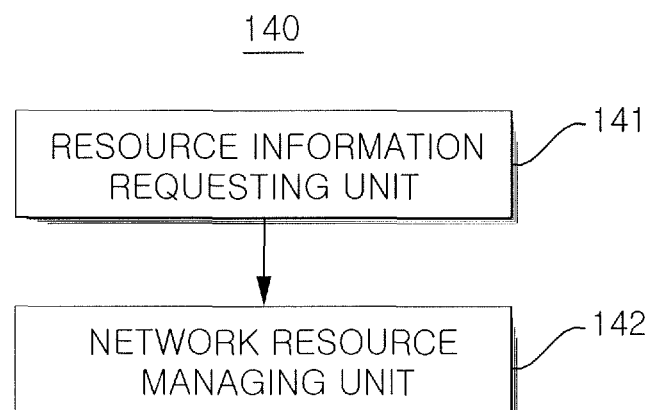
Figure 4:
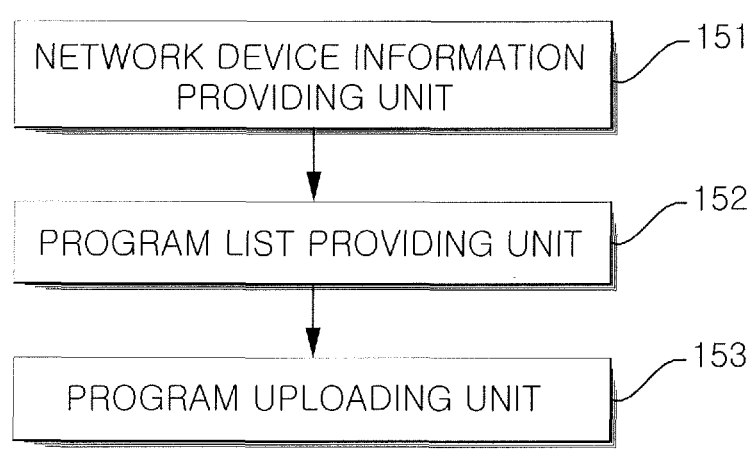

FIG. 1 is a block diagram schematically showing a network service supporting system according to an exemplary embodiment of the present invention. FIGS. 2 to 4 are block diagrams showing an internal configuration of the network service supporting system in detail. With reference to FIGS. 1 to 4, an exemplary embodiment will be described.

Referring to FIG. 1, a network service supporting system 100 includes network resources 110 and a network service supporting unit 120.

The network resources 110 configure the network based on virtualization.

The network service supporting unit 120 dynamically provides a network service program by an open API (Open Application Programmer Interface) to a network resource selected by a network service provider to support the network service. The network service supporting unit 120 is a concept corresponding to a network service store. The network resources refer to a CPU, a storage, a memory, or a bandwidth that is provided in network equipment such as a router, a switch, a PC, or a wireless router to be available.

When a network service program is stored in order to be dynamically provided to a network resource, the network service supporting unit 120 includes an open API processing unit 130, a network resource management agent 140, and a program upload agent 150.

The open API processing unit 130 is configured to process an open API related with a network service program which will be generated. As shown in FIG. 2, the open API processing unit 130 includes an open API extracting unit 131, an open API transmitting unit 132, a generation fact recognizing unit 133, and a storing information providing unit 134. The open API extracting unit 131 is configured to extract an open API related with a network service that will be provided through a selected network device when a network device is selected. The open API transmitting unit 132 is configured to transmit the extracted open API to a predetermined terminal. The generation fact recognizing unit 133 is configured to recognize the generation fact when a network service program is generated based on the transmitted open API. The storing information providing unit 134 is configured to provide storing information for storing the network service program to a terminal that is accessed by a user who generates the network service program, when the generation fact is recognized. In the above description, the predetermined terminal refers to a terminal that is accessed by a service developer who will develop a corresponding network service. Further, when a request from a service developer to upload the network service program is received, the recognition of this fact may be an example of recognizing the generation of the fact.

The network resource management agent 140 is configured to manage the network resources on the basis of network resource information including the list of available resources for every network device and utilization for every resource. The network resource management agent 140, as shown in FIG. 3, may include a resource information requesting unit 141 and a network resource managing unit 142. The resource information requesting unit 141 is configured to request the network resource information to the selected network device at every predetermined timing or whenever there is a demand to provide resource information. The network resource managing unit 142 is configured to manage the network resources based on reported network resource information when the network resource information is reported.

The program upload agent 150 is configured to upload a network service program, which is selected from the network service program list taking the network resource information into consideration, to a corresponding network device. The program upload agent 150, as shown in FIG. 4, may include a network device information providing unit 151, a program list providing unit 152, and a program uploading unit 153. The network device information providing unit 151 is configured to provide network device information including identification information of a network device and resource information for every network device. The program list providing unit 152 is configured to provide, when a network device is selected based on the provided network device information, a network service program list related with the network device to a terminal that is accessed by a user who selects the network device. The program uploading unit 153 is configured to upload, when a network service program is selected from the provided program list, the selected network service program to the corresponding network device. The program upload agent 150 may further include a terminal authenticating unit 154. The terminal authenticating unit 154 is configured to authenticate whether the terminal that requests the network device information is a registered terminal. In this case, the network device information providing unit 151 provides the network device information only to an authenticated terminal.

The open API processing unit 130, the network resource management agent 140, and a program upload agent 150 correspond to an open API and programmer interface, a network resource management agent, and a program/service list management and upload agent, respectively.

The network service supporting system 100 may further include at least one of a network device 160, a service developer terminal 170, and a service provider terminal 180. The network device 160 includes at least one network resource, and further includes an adapter that modifies and installs the open API using a Kernel to satisfy a hardware standard. This adapter allows the network device 160 to dynamically install the network service program. The service developer terminal 170 creates a network service program with the provided open API, and registers the created network service program into the network service supporting unit 120. The service provider terminal 180 is configured to process the rental of the network device based on the network resource that is virtualized in order to provide the network service.

The network service supporting system 100 suggests a network service architecture constituted by a service producer, a service provider, network equipment such as a router, a switch, a PC, or a wireless router, and a network service store and a service supporting method using the network service architecture. According to conventional network equipment, since a service program that is fixed by device venders is installed, it is difficult to install or use a dynamic program or service that satisfies the various demands of future service providers. In order to overcome this disadvantage, the system 100 according to the exemplary embodiment performs a process that the service producer develops a program required for a service using an open API or an interface provided by a network device vendor and then notifies the service to the network service store, and a process that the service provider selects a network device required for the service and a necessary resource (CPU, storage, memory, bandwidth, etc.) from the network service store and then selects the program notified by the service producer in advance as the program required for the service to dynamically install the selected program into the network device. In this case, an adapter that modifies the open API to be fitted with the corresponding device in order to install an open service program programmed by the service producer, and an adapter to process the open interface are added to the network device. If the system according to the exemplary embodiment is used, it is possible to diversely develop, install and provide a dynamic program, which the service provider requires, in the network devices in which only conventional fixed service program could be installed. Further, as compared with the conventional system in which only IP based Internet service is available, the system can provide various services that are demanded by the service provider by differentiating the grade of services, security level and billing system.

Figure 5:
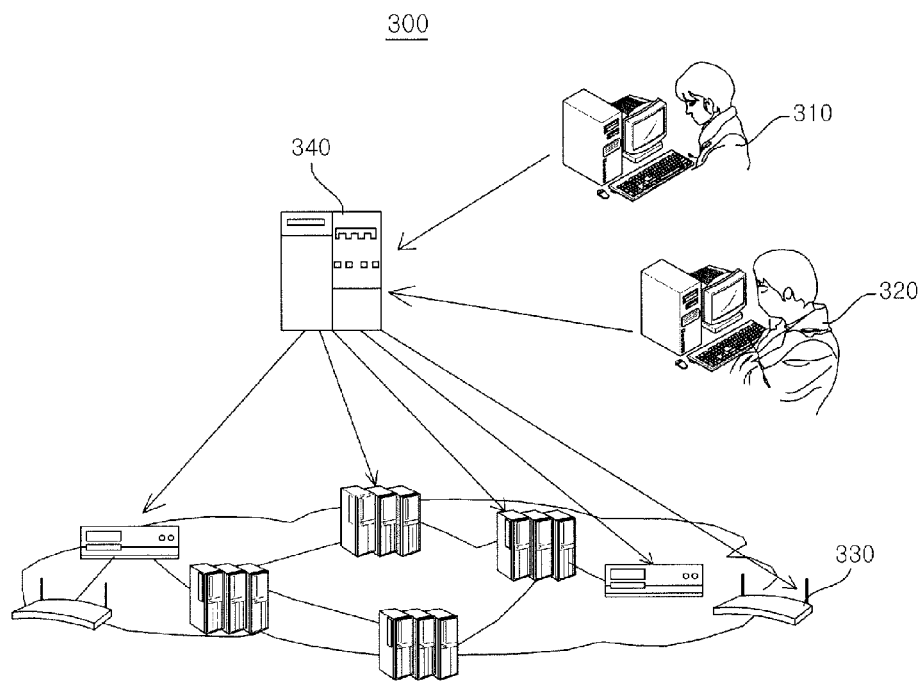
FIG. 5 is a configuration diagram showing a network service method according to an exemplary embodiment of the present invention.

FIG. 5 is a configuration diagram showing a network service method according to an exemplary embodiment. Referring to FIG. 5, network service architecture 300 includes a service producer 310, a service provider 320, network resources 330, and a network service store 400. The network resources 330 are provided in a network device such as a router, a switch, a PC, or a wireless router and refer to virtualization based programmable network resources. Examples of the network resources 330 include a CPU, a storage, a memory, and a bandwidth. The service producer 310 refers to an independent program developer who programs a new network service using an API provided by the service store 400 to register the program into the service store 400. The service provider 320 refers to a business operator who virtualizes the network resources and rent the network resources to provide the service, independently from a network infra provider (network company). The network service store 400 is a concept distinguished from smart phone application such as an APP store of Apple, or an Android market. That is, the network service store 400 operates a program by making the program on the Kernel as a module and registering the program into the network devices such as a router, a switch, a PC, or a wireless router, not in the user terminal such as a smart phone. Further, the network service store dynamically downloads the programs from the service provider and installs the program in the network device to directly use.

Figure 6:
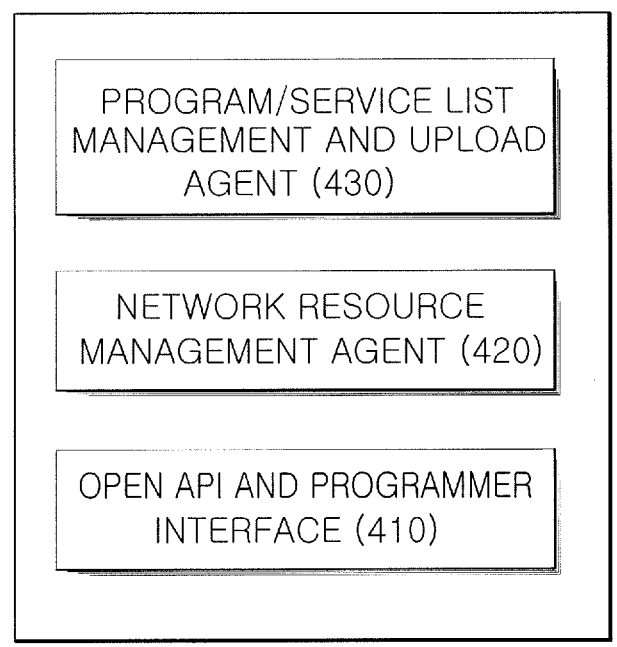
FIG. 6 is a diagram showing a structure of a network service store according to an exemplary embodiment of the present invention.

FIG. 6 is a diagram showing a structure of a network service store according to an exemplary embodiment. The network service store 400 is configured to diversely develop, install and provide a dynamic program, which the service provider requires, in the network devices, and includes an open API and programmer interface 410, a network resource management agent 420, and a program/service list management and upload agent 430. In the exemplary embodiment, the network service store 400 supports network service architecture constituted by a service producer, a service provider, a network device, and a network service store. The open API and programmer interface 410 includes an interface that transmits an API list and a service program developed through the API that allows the service producer to independently develop and program various service programs on the network in a network device hardware and a substrate to the service store and notifies it to the service store. The API list should be provided with various functions in order to develop all existing IP network protocols and services, and includes a new protocol configuration API function and packet handler function in order to support an existing non-IP service such as future Internet. The API list may be variously provided depending on a service group to be provided by a service store company. The programmer interface is an interface that uploads the network service program made using an open API to the service store, and may be embodied by various ways such as a TCP/IP socket program.

Figure 7:
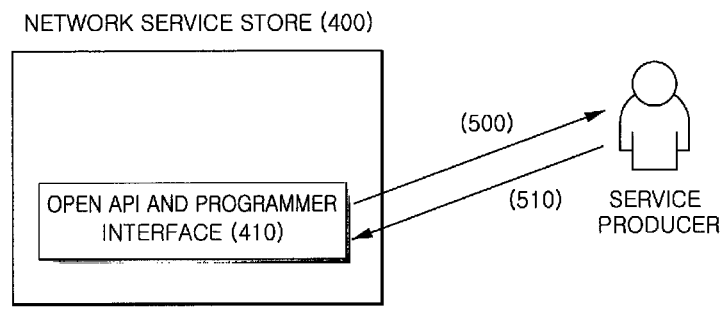
FIG. 7 is a diagram showing a method of using an open API and programmer interface.

FIG. 7 is a diagram showing a method of using an open API and programmer interface. The network service store 400 provides an open API, which programs a service of a network device for a service producer, through the open API and programmer interface 410 (500). The service producer makes (compiles) a network service using the provided open API and uploads the program/service to the store through the programmer interface (510).

Figure 8:
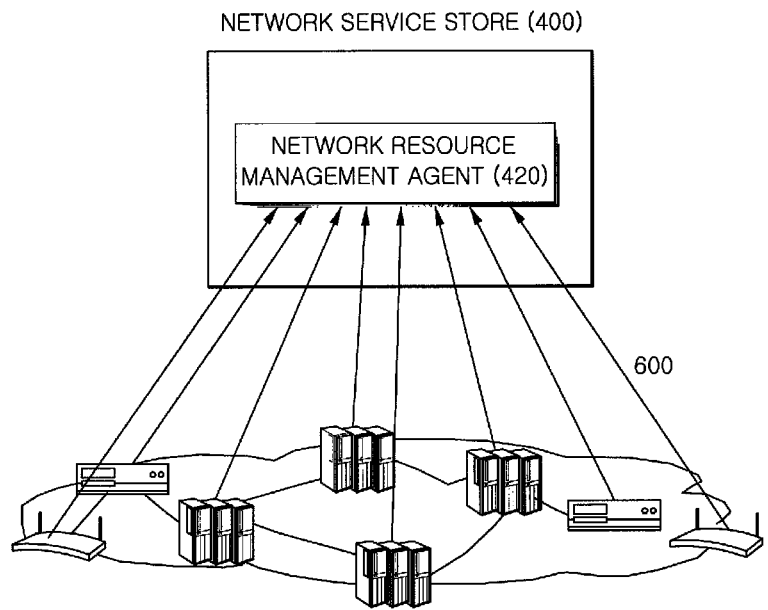
FIG. 8 is a diagram showing a method of using a network resource management agent.

FIG. 8 is a diagram showing a method of using a network resource management agent. The network service store 400 reports an available resource list and utilization (%) of the respective network devices through a network resource management agent 420 (600). For this purpose, the network equipment virtualizes the resources such as a CPU, a storage, a memory, or a bandwidth to manage the utilization, and send the corresponding report for every resource to the network service store periodically or whenever there is a demand from the network service store.

Figure 9:
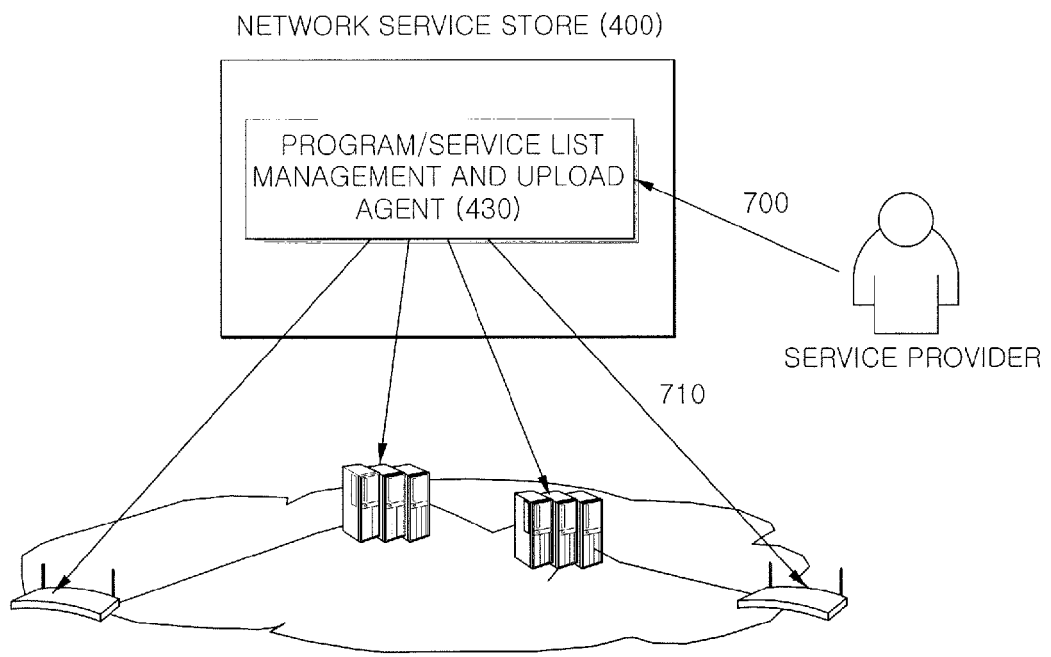
FIG. 9 is a diagram showing a method of using a program/service list management and upload agent.

FIG. 9 is a diagram showing a method of using a program/service list management and upload agent. The service provider requests the network service store to provide network equipment and available resources for a service through a program/service list management and upload agent 430 and then selects a required device. Thereafter, the service provider requests to upload the required service from the service list (700). Then, the network service store can upload the service required for the network equipment (710). In this case, the network service store and the network equipment should be provided with authentication and safe channel communication to upload the network service program.

Figure 10:
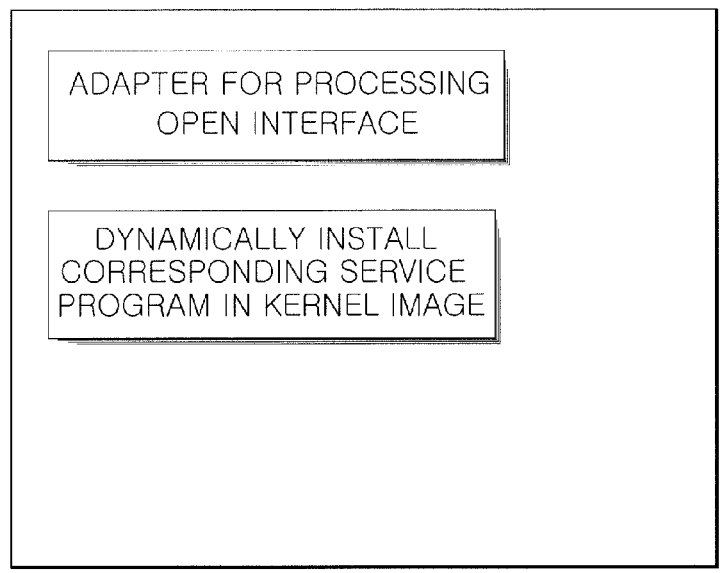
FIG. 10 is a diagram showing a structure of a network device in which an open interface processing function is added.

FIG. 10 is a diagram showing a structure of a network device in which an open interface processing function is added. The network equipment according to an exemplary embodiment additionally provides an adapter for processing an open interface in the existing network device. Specifically, the adapter modifies the open API to be fitted with the corresponding device to install an open service program that is programmed by a service producer. In this case, the corresponding service program should be dynamically installed in a Kernel image of the network device as a module by a request for upload of the program requested by the network service store.

Figure 11:
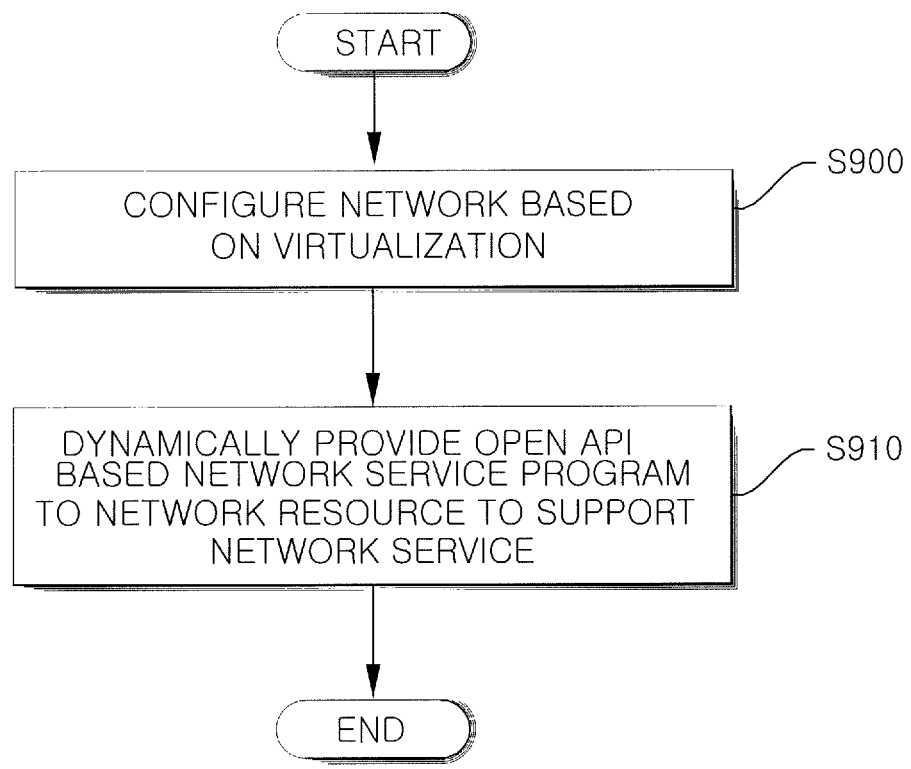
FIG. 11 is a flowchart showing a network service supporting method according to an exemplary embodiment of the present invention.

Next, a network service supporting method of a network service supporting system 100 will be described with reference to FIG. 11. FIG. 11 is a flowchart showing a network service supporting method according to an exemplary embodiment of the present invention.

First, a network is configured by network resources based on virtualization (network configuring step S900).

Next, a network service program by an open API is dynamically provided to a network resource selected by a network service provider to support a network service (network service supporting step S910).

The network service supporting step S910 may include an open API processing step, a network resource management agent step, and a program upload agent step when the network service program is stored to dynamically provide the program into the network resource.

The open API processing step is a step of processing an open API related with a network service program to be generated. In the exemplary embodiment, the open API processing step may include an open API extracting step, an open API transmitting step, a generation fact recognizing step, and a storing information providing step. The open API extracting step extracts an open API related with a network service that will be provided through a selected network device when a network device is selected. The open API transmitting step transmits the extracted open API to a predetermined terminal. The generation fact recognizing step recognizes the generation fact when a network service program is generated based on the transmitted open API. The storing information providing step provides storing information for storing the network service program to a terminal that is accessed by a user who generates the network service program, when the generation fact is recognized.

The network resource management agent step manages the network resources on the basis of network resource information including the list of available resources for every network device and utilization for every resource. In the exemplary embodiment, the network resource management agent step may include a resource information requesting step and a resource managing step. The resource information requesting step sends requests of the network resource information to the selected network device at every predetermined timing or whenever there is a demand to provide resource information. The network resource managing step manages the network resources based on reported network resource information when the network resource information is reported.

The program upload agent step uploads a network service program, which is selected from the network service program list taking the network resource information into consideration, to a corresponding network device. In the exemplary embodiment, the program upload agent step includes a network device information providing step, a program list providing step, and a program uploading step. The network device information providing step provides network device information including identification information of a network device and resource information for every network device. The program list providing step provides, when a network device is selected based on the provided network device information, a network service program list related with the network device to a terminal that is accessed by a user who selects the network device. Further, the program uploading step uploads, when a network service program is selected from the provided program list, the selected network service program to the corresponding network device. The program upload agent step may further include a terminal authenticating step. The terminal authenticating step authenticates whether the terminal that requests the network device information is a registered terminal. In this case, the network device information providing step may provide the network device information only to the authenticated terminal.

The network service supporting step may further include an open API installing step and a network service program installing step. The open API installing step allows a network device including at least one network resource to modify and install the open API using a Kernel to satisfy a hardware standard. If the open API is installed, the network service program installing step allows the network device to receive the network service program and dynamically install the network service program. In the exemplary embodiment, the open API installing step and the network service program installing step may be performed together with the network service supporting step.

The present invention can be applied when a network service is supported using network virtualization.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for supporting a network service, comprising:
a computer system comprising a processor and a memory;
network resources operating on the computer system and adapted to configure a network based on virtualization; and
a network service supporting unit operating on the computer system and adapted to dynamically provide a network service program by an open API (Application Programmer Interface) to a network resource selected by a network service provider to support the network service, wherein the network service supporting unit includes:
an open API processing unit configured to process an open API related with a network service program which will be generated;
a network resource management agent configured to manage the network resources on the basis of network resource information including the list of available resources for every network device and utilization for every resource; and
a program upload agent configured to upload a network service program, which is selected from the network service program list taking the network resource information into consideration, to a corresponding network device, and
wherein the program upload agent includes:
a network device information providing unit configured to provide network device information including identification information of a network device and resource information for every network device;
a program list providing unit configured to provide, when a network device is selected based on the provided network device information, a network service program list related with the network device to a terminal that is accessed by a user who selects the network device; and
a program uploading unit configured to upload, when a network service program is selected from the provided program list, the selected network service program to the corresponding network device.

2. The system of claim 1, wherein the open API processing unit includes:
an open API extracting unit configured to extract an open API related with a network service that will be provided through a selected network device when a network device is selected;
an open API transmitting unit configured to transmit the extracted open API to a predetermined terminal;
a generation fact recognizing unit configured to recognize the generation fact when a network service program is generated based on the transmitted open API; and
a storing information providing unit configured to provide storing information for storing the network service program to a terminal that is accessed by a user who generates the network service program, when the generation fact is recognized.

3. The system of claim 1, wherein the network resource management agent includes:
   a resource information requesting unit configured to request the network resource information to the selected network device at every predetermined timing or whenever there is a demand to provide resource information; and
   a network resource managing unit configured to manage the network resources based on reported network resource information when the network resource information according to the request is reported.

4. The system of claim 1, wherein the program upload agent further includes a terminal authenticating unit that authenticates whether the terminal that requests the network device information is a registered terminal, and the network device information providing unit provides the network device information only to an authenticated terminal.

5. The system of claim 1, further comprising: a network device having at least one network resource and including an adapter that modifies and installs the open API to satisfy a hardware standard using a Kernel.

6. The system of claim 1, further comprising: a service developer terminal configured to create a network service program with the provided open API, and register the created network service program into the network service supporting unit; or a service provider terminal configured to process the rental of the network device based on the network resource that is virtualized in order to provide the network service.

7. A method for supporting a network service, comprising:
   a network configuring step to configure a network using network resources based on virtualization; and
   a network service supporting step to dynamically provide a network service program by an open API (Open Application Programmer Interface) to a network resource selected by a network service provider to support the network service
   wherein the network service supporting step includes:
   an open API processing step to process an open API related with a network service program which will be generated;
   a network resource management agent step to manage the network resources on the basis of network resource information including the list of available resources for every network device and utilization for every resource; and
   a program upload agent step to upload a network service program, which is selected from the network service program list taking the network resource information into consideration, to a corresponding network device, wherein the program upload agent step includes:
   a network device information providing step to provide network device information including identification information of a network device and resource information for every network device;
   a program list providing step to provide, when a network device is selected based on the provided network device information, a network service program list related with the network device to a terminal that is accessed by a user who selects the network device; and
   a program uploading step to upload, when a network service program is selected from the provided program list, the selected network service program to the corresponding network device.

8. The method of claim 7, wherein the open API processing step includes:
   an open API extracting step to extract an open API related with a network service that will be provided through a selected network device when a network device is selected;
   an open API transmitting step to transmit the extracted open API to a predetermined terminal;
   a generation fact recognizing step to recognize the generation fact when a network service program is generated based on the transmitted open API; and
   a storing information providing step to provide storing information for storing the network service program to a terminal that is accessed by a user who generates the network service program, when the generation fact is recognized.

9. The method of claim 7, wherein the network resource management agent step includes:
   a resource information requesting step to request the network resource information to the selected network device at every predetermined timing or whenever there is a demand to provide resource information; and
   a network resource managing step to manage the network resources based on reported network resource information when the network resource information according to the request is reported.

10. The method of claim 7, wherein the program upload agent step further includes a terminal authenticating step to authenticate whether the terminal that requests the network device information is a registered terminal, and the network device information providing step provides the network device information only to an authenticated terminal.

11. The method of claim 7, further comprising: an open API installing step to allow a network device having at least one network resource to modify and install the open API to satisfy a hardware standard using a Kernel; and a network service program installing step to allow the network device to dynamically receive and install the network service program when the open API is installed.

* * * * *